UNITED STATES PATENT OFFICE.

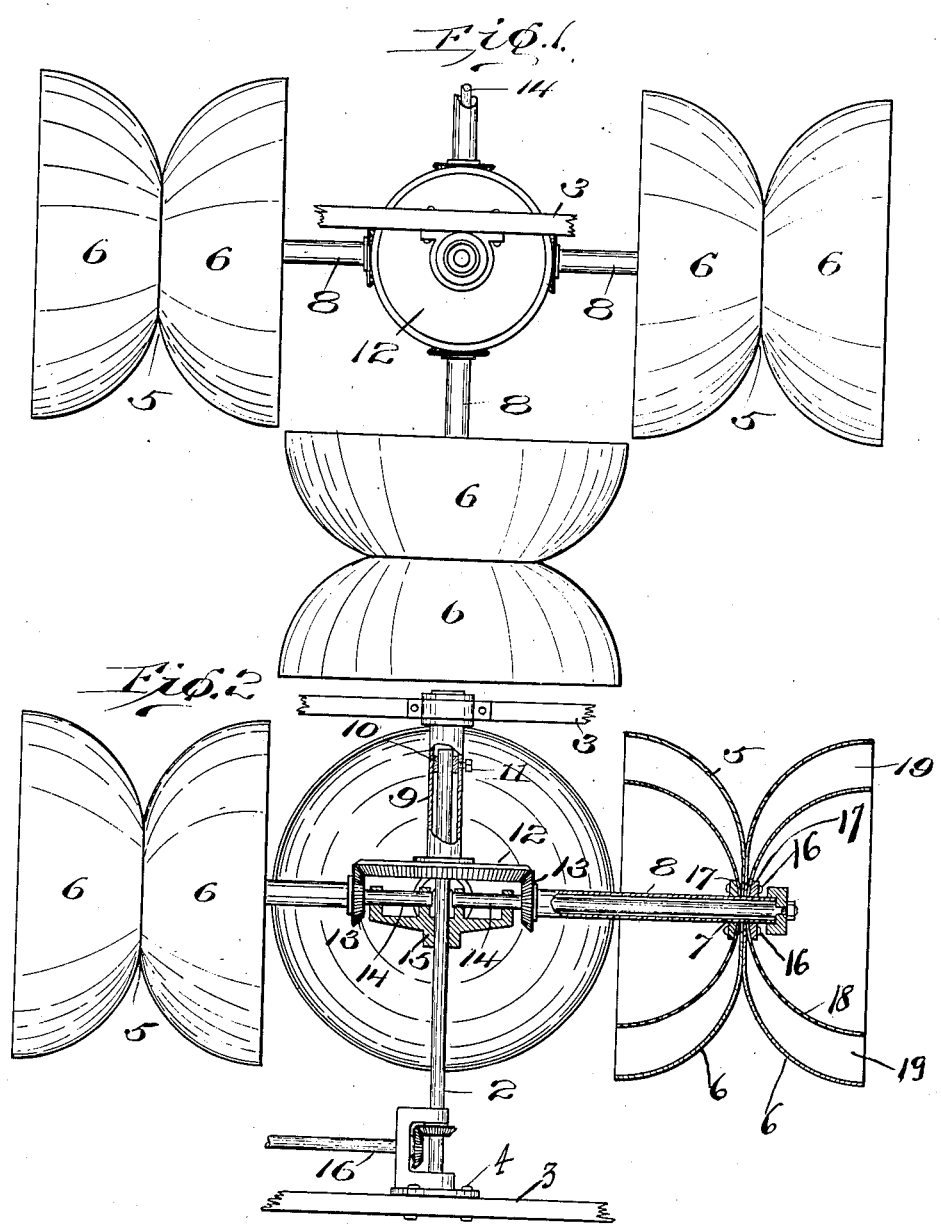

CHARLES J. LOW, OF CHELAN, WASHINGTON.

PROPELLER.

1,041,825.   Specification of Letters Patent.   Patented Oct. 22, 1912.

Application filed February 14, 1911. Serial No. 608,637.

*To all whom it may concern:*

Be it known that I, CHARLES J. LOW, a citizen of the United States, residing at Chelan, in the county of Chelan and State of Washington, have invented certain new and useful Improvements in Propellers, of which the following is a specification.

My invention has relation to propellers and one of the main objects thereof is to provide a device of this nature that is applicable to a flying machine or aeroplane or other airships, water craft or cars, by the employment of connecting means adapted for the purpose.

The type of device that I have invented is designed principally to lift an airship from the earth and to support the same in a horizontal plane. The device is given this propelling action by being forced around a vertical shaft by power applied to the device.

In order to fully accomplish what I have outlined in the foregoing paragraph I have constructed a device comprising a plurality of pairs of hemispheres, which whirl as a whole and each pair of which hemispheres revolves within itself separately. I so construct the device that the axis of each hemisphere lies in a plane at right angles to the vertical shaft of the device.

With the foregoing and other objects in view my invention consists of the novel construction, combination and arrangement of parts as are described in this specification, illustrated in the accompanying drawings forming a part thereof and particularly pointed out in the appended claims.

Referring to the drawings, Figure 1 is a top plan view of my invention one of the propellers being broken away. Fig. 2 is a front elevational view of my invention, one of the propellers having been removed, while the other is shown in vertical section.

Referring more particularly to the drawings my invention is described as follows: The device 1 is mounted rotatably upon the vertical shaft 2, which shaft is interposed between beams 3 of the framework of the airship to which it is mounted, by suitable means, such as nut and bolt connections 4. Each propeller 5 is constructed of two hemispheres 6, which are joined together near their centers. Passing through each hemisphere 6 is a perforation or opening 7, through which opening extends the horizontal shaft 8, each of which shafts supporting a respective propeller 5. There are preferably four propellers 5, the shafts of each two adjacent propellers extending at right angles to each other in a horizontal plane. The vertical shaft 2 extends into the hollow tubular shaft 9 and is held in contact thereto by means of a ring 10 interposed between the outer periphery of the shaft 2 and the inner periphery of the shaft 9 and by a set screw 11 which may be adjusted to the necessary tension. The shaft 9 does not rotate with the shaft 2, but forms a bearing wherein said shaft 2 rotates, said shaft 9 being fixed to the upper of said beams 3. The shaft 9 carries at its lower end a beveled gear 12, which gear intermeshes with the vertical beveled gears 13 secured to the inner ends, respectively, of said horizontal shafts 8. Said shafts 8 have extending thereinto shafts 14 of lesser diameter and upon which respective shafts 8 are supported. The inner ends of the reduced shafts 14 find bearings in the bracket 15 which is secured to the vertical shaft 2. Thus it will be seen that when the shaft 16 which is driven by a motor carried by the framework of the device is rotated it will transmit its power to the vertical shaft 2, by means of beveled gears, which shaft 2 will in turn transmit its power to the horizontal shafts 8 by means of the respective beveled gear wheels 12 and 13 as above described. At the same time the said vertical shaft 2 will carry the propellers 5 with it by means of the bracket 15 and the reduced horizontal shafts 14. Thus by this arrangement I not only provide a circular motion of the propellers as one entirety but each of them revolves, at the same, within itself separately.

As above stated each propeller 5 is constructed of a pair of hemispheres whose curved parts contact and are secured together by nut and bolt connections 16 and annular rings 17. Within each of the hemispheres 6 is a secondary hemisphere 18 of a lesser radii, thereby leaving a space 19, which gradually decreases as the center of the hemispheres are approached, between each respective hemispheres 6 and hemisphere 18.

Although I have specifically described the construction, combination and arrangement of the several parts of my invention yet I do not confine myself to such construction, combination and arrangement but reserve the right to make such changes therein as do not depart from the spirit of the invention or the scope of the appended claims.

Having described my invention what I claim as new, is:

1. In a device of the kind described comprising a vertical shaft, which is rotatably held to the framework of a device on which the device is mounted, horizontal shafts extending radially from the vertical shaft, a pair of hemispheres secured to the outer end of each horizontal shaft, means interposed between each pair of hemispheres and the vertical shaft whereby the former are held to said shaft, said means comprising a horizontal shaft for each pair of hemispheres, substantially as shown.

2. In a device of the kind described comprising a vertical shaft which is rotatably held to the framework of a device on which the device is mounted, horizontal shafts extending radially from the vertical shaft, said horizontal shafts each having a pair of hemispheres secured to the outer end thereof, the hemispheres of each pair having their curved parts contacting and provided with registering perforations within the contacting portions, means interposed between each pair of hemispheres and the vertical shaft whereby the former are held to said shaft, said means comprising a horizontal shaft for each pair of hemispheres, each of which horizontal shafts extends through the registering perforations in its respective pair of hemispheres, each of said first mentioned horizontal shafts provided with a beveled gear upon the inner end thereof, and means to transmit power from the vertical shaft to said horizontal shafts, which means include said beveled gears.

3. A device of the kind described, adapted to be secured to the framework of an air ship or other device, comprising a vertical shaft, four pairs of hemispheres and a horizontal shaft corresponding to each pair of hemispheres, the vertical shaft extending into a tubular bearing and held therein for rotation, said bearing provided with a large beveled gear at its lower end, a bracket secured to the vertical shaft, a plurality of horizontal shafts of lesser diameter than the first-mentioned horizontal shafts upon which said first-mentioned horizontal shafts rotate, the second-mentioned horizontal shafts being held to said bracket which is secured to the vertical shaft, a beveled gear secured to the inner end of each first mentioned horizontal shaft, each of said beveled gears in conjunction with the large beveled gear, coöperating to transmit power from the vertical shaft to its respective horizontal shaft, thereby giving to each pair of hemispheres rotation within itself which is distinct from the rotation of the device as an entirety.

In testimony whereof I affix my signature, in presence of two witnesses.

CHARLES J. LOW.

Witnesses:
J. A. VAN SLYKE,
H. W. VAN SLYKE.